March 10, 1970  J. W. WATERLOO, SR  3,500,203
MOVING COIL-TYPE ELECTRICAL MEASURING INSTRUMENT HAVING MULTIPLE
FIELD POLES EACH PROVIDED WITH AN ADJUSTABLE ROTARY MAGNET
AND A VERNIER SLUG FOR CALIBRATION OF THE INSTRUMENT AT
MULTIPLE POINTS ON THE SCALE
Filed Dec. 4, 1967 3 Sheets-Sheet 1
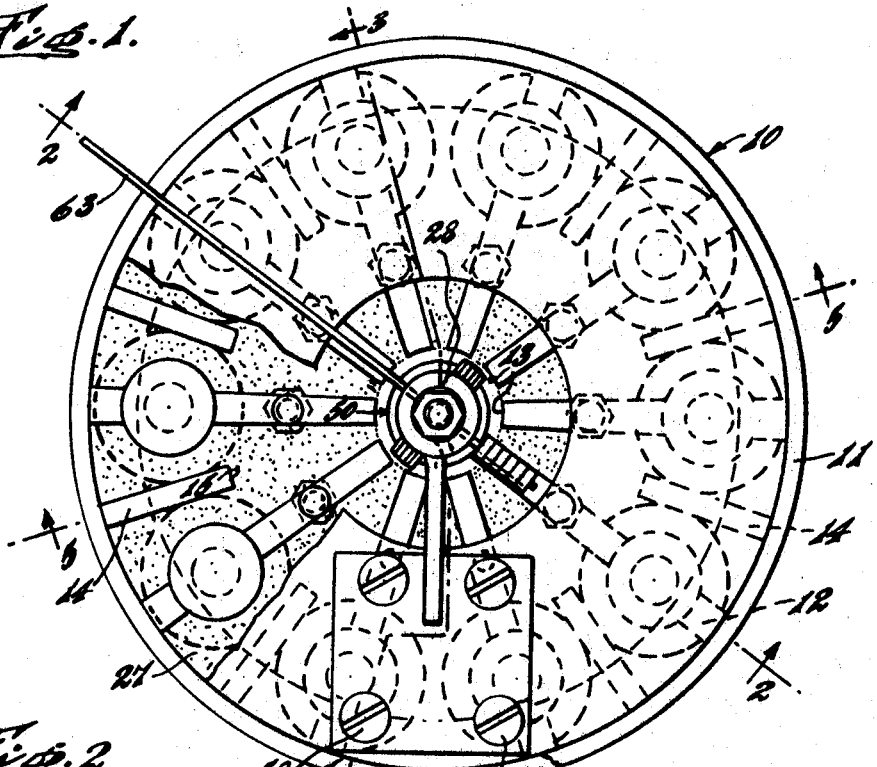
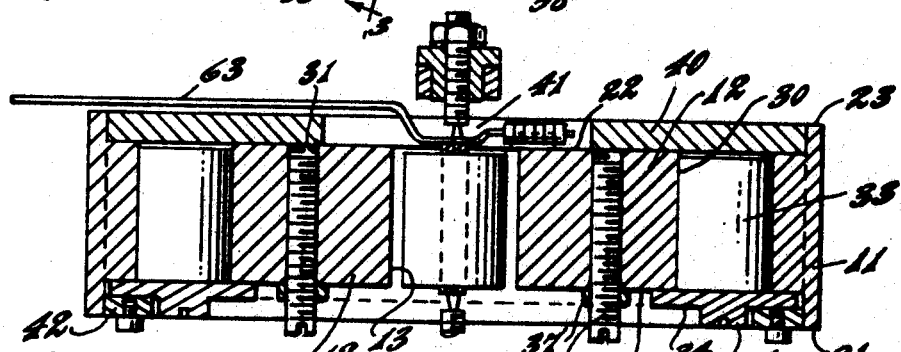
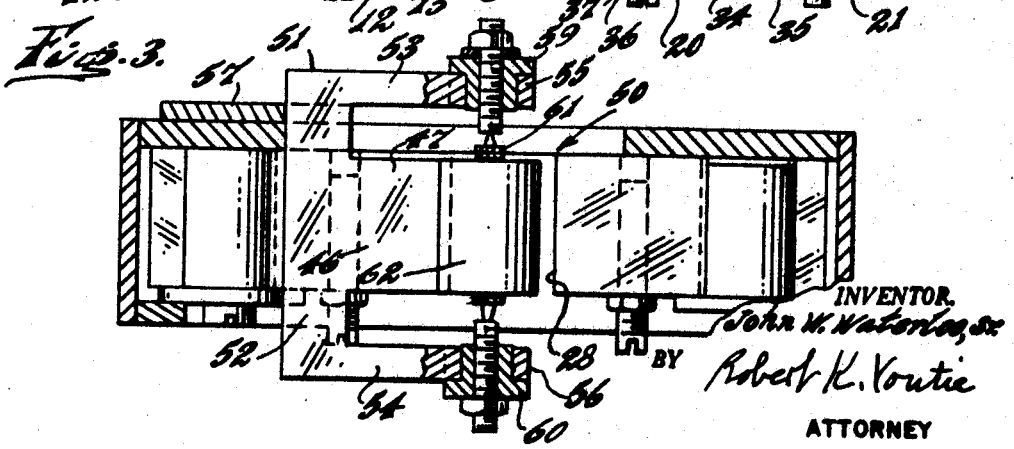
INVENTOR.
John W. Waterloo, Sr.
BY Robert K. Youtie
ATTORNEY March 10, 1970  J. W. WATERLOO, SR  3,500,203
MOVING COIL-TYPE ELECTRICAL MEASURING INSTRUMENT HAVING MULTIPLE
FIELD POLES EACH PROVIDED WITH AN ADJUSTABLE ROTARY MAGNET
AND A VERNIER SLUG FOR CALIBRATION OF THE INSTRUMENT AT
MULTIPLE POINTS ON THE SCALE
Filed Dec. 4, 1967  3 Sheets-Sheet 2
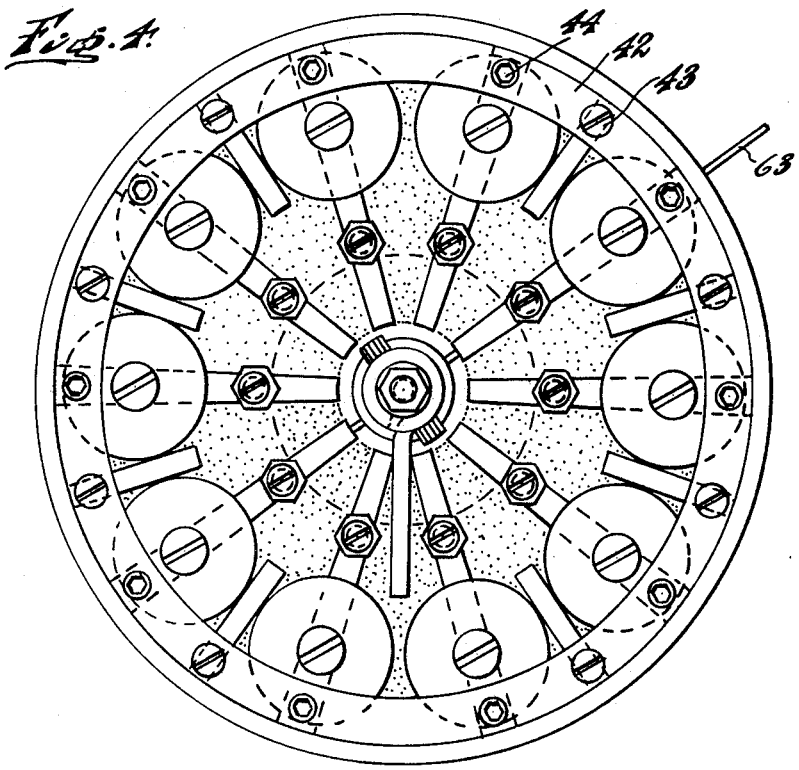
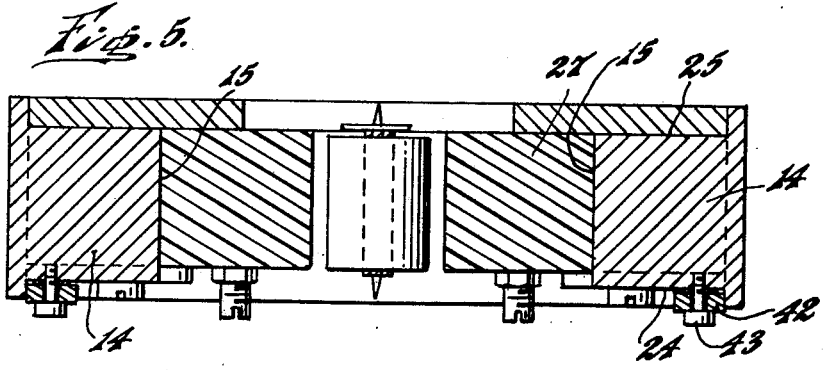
INVENTOR.
John W. Waterloo, Sr.
BY Robert K. Youtie
ATTORNEY March 10, 1970　　J. W. WATERLOO, SR　　3,500,203
MOVING COIL-TYPE ELECTRICAL MEASURING INSTRUMENT HAVING MULTIPLE
FIELD POLES EACH PROVIDED WITH AN ADJUSTABLE ROTARY MAGNET
AND A VERNIER SLUG FOR CALIBRATION OF THE INSTRUMENT AT
MULTIPLE POINTS ON THE SCALE
Filed Dec. 4, 1967　　　　　　　　　　　　　　　3 Sheets-Sheet 3
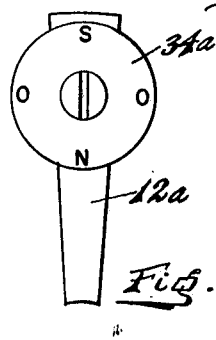
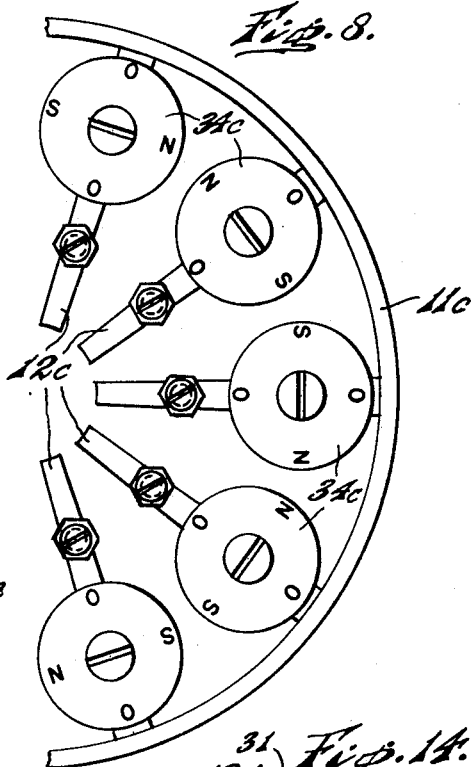
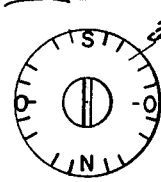
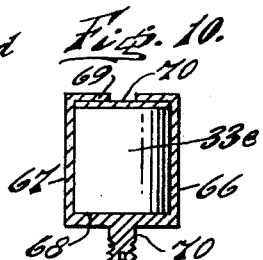
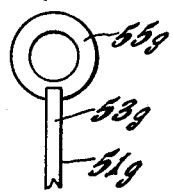
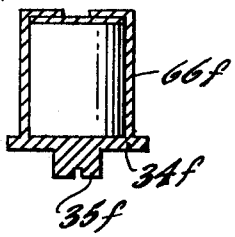
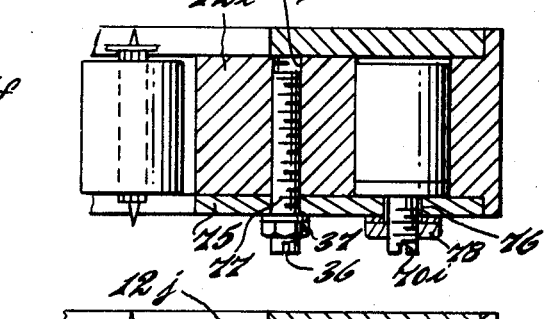
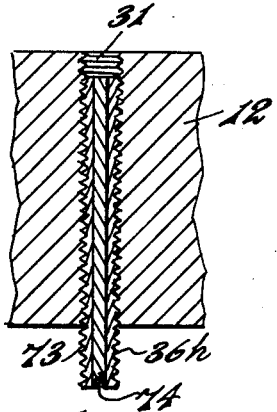
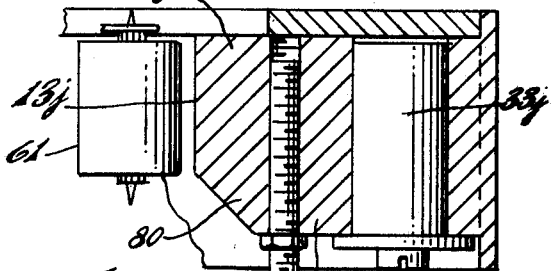
INVENTOR.
John W. Waterloo, Sr.
BY Robert K. Youtie
ATTORNEY United States Patent Office 3,500,203
Patented Mar. 10, 1970

3,500,203
MOVING COIL-TYPE ELECTRICAL MEASURING INSTRUMENT HAVING MULTIPLE FIELD POLES EACH PROVIDED WITH AN ADJUSTABLE ROTARY MAGNET AND A VERNIER SLUG FOR CALIBRATION OF THE INSTRUMENT AT MULTIPLE POINTS ON THE SCALE
John W. Waterloo, Sr., 217 Richard Road,
Chester, Pa. 19014
Filed Dec. 4, 1967, Ser. No. 687,581
Int. Cl. G01r 1/08
U.S. Cl. 324—151                    7 Claims

ABSTRACT OF THE DISCLOSURE

This invention is essentially concerned with an electrical measuring device wherein a plurality of angularly spaced pole pieces are provided with respective adjustably locatable magnets for selectively varying the pattern of magnetic forces to calibrate a centrally mounted movable coil.

BACKGROUND OF THE INVENTION

As is well known to those versed in the art, electric measuring devices or meters of commercial size and price have an accuracy limitation of about one percent of the scale, and are generally limited to an arcuate scale of about ninety degrees. Further, original calibration in manufacture is relatively expensive, and calibration in the field is extremely difficult, if possible at all.

SUMMARY

Accordingly, it is an important object of the present invention to provide an electric measuring device or meter construction which overcomes the above-mentioned difficulties, achieves a greater length of scale as compared to an equivalent-size meter by operating over a larger arc, approximately fifty percent larger. The meter construction of the present invention further contemplates greatly increased precision or accuracy of measurement in a commercial-production meter without increased cost.

It is still a further object of the present invention to provide an electric measuring-device or meter construction of the type described which is capable of quick and easy recalibration at any time by persons without special skill, so as to substantially reduce maintenance costs and substantially eliminate or minimize meter down time.

It is still a further object of the present invention to provide an electric measuring device or meter having the advantageous characteristics mentioned in the preceding paragraphs which is simple in construction, durable and reliable throughout a long useful life, and capable of economic mass production for sale at a reasonable price.

Other objects of the present invention will become apparent upon reading the following specification and referring to the accompanying drawing, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIGURE 1 is a top plan view, partly broken away, showing a meter constructed in accordance with the teachings of the present invention.

FIGURE 2 is a transverse sectional view taken generally along the line 2—2 of FIGURE 1.

FIGURE 3 is a transverse sectional view taken generally along the line 3—3 of FIGURE 1.

FIGURE 4 is a bottom plan view of the meter of FIGURE 1.

FIGURE 5 is a transverse sectional view taken generally along the line 5—5 of FIGURE 1.

FIGURE 6 is a plan view showing a slightly modified form of pole piece and magnet calibration cap apart from the meter.

FIGURE 7 is a plan view showing another embodiment of pole piece and calibration cap apart from the meter.

FIGURE 8 is a partial bottom plan view similar to FIGURE 4, but illustrating the calibration caps in an initial or starting position for rough calibration.

FIGURE 9 is a plan view showing a further embodiment of calibration cap.

FIGURE 10 is a sectional view illustrating a slightly modified magnet construction apart from the meter.

FIGURE 11 is a sectional view illustrating a further embodiment of magnet for use in the instant meter.

FIGURE 12 is a partial plan view showing a slightly modified embodiment of moving-coil bracket or holder.

FIGURE 13 is a partial sectional elevational view showing a slightly modified embodiment of vernier control or fine-calibration slug.

FIGURE 14 is a partial sectional elevational view similar to FIGURE 2, but illustrating a slightly modified embodiment.

FIGURE 15 is a partial sectional view similar to FIGURE 14 but illustrating a further embodiment of the present invention.

DESCRIPTION OF THE PREFERRED EMBODIMENTS

Referring now more particularly to the drawings, and specifically to FIGURES 1–5 thereof, a meter or electric measuring device is there generally designated 10, and includes an annular or generally circular rim or band 11 of ferrous or magnetic material. Arranged at angularly spaced-apart locations within the rim 11, and extending generally radially inward therefrom, are a plurality of magnetic bars or pole pieces 12. These pole pieces 12 may be integral with the rim 11, or separate therefrom and fixedly secured thereto, as by welding, or other suitable means. The pole pieces 12 extend radially inwardly and terminate spaced from each other short of the center of rim 11, the ends 13 of the several pole pieces 12 effectively defining therebetween a central opening coaxially of the rim 11.

Spaced between each adjacent pair of pole pieces 12, and extending radially inward from the rim 11, is a magnetic bar or shield 14. That is, each magnetic bar or shield 14 is spaced medially between an adjacent pair of pole pieces 12, so that the shields 14 and pole pieces are all equally angularly spaced about the interior of the rim 11. The shields 14 are also integral with or fixedly secured, by any suitable means, to the rim 11, and have their inner ends 15 terminating radially outwardly of the inner pole-piece ends 13.

As best seen in FIGURES 2, 3 and 5, the pole pieces or bars 12, and the shield members or bars 14 have their front and back surfaces spaced inward from the front and back edges of the rim 11. In particular, the pole pieces 12 have their lower surfaces 20 all substantially coplanar, and spaced inward or upward from the lower edge 21 of the rim 11, while the upper surfaces 22 of the pole pieces 12 are also coplanar, and spaced inward or downward from the upper edge 23 of the rim. Similarly, the shields 14 have their lower surfaces 24 all substantially coplanar with each other, as well as the undersurfaces 20 of the pole pieces 12, while the upper surfaces 25 of the several shields 14 are coplanar with each other and with the upper surfaces of the pole pieces 12.

The spaces between the several pole pieces 12 and shields 14 are advantageously filled by a suitable magnetic-insulating material 27, such as plastic or nonferrous metal. The filling 27 may have its lower and upper surfaces spaced inward from the lower and upper edges 21 and 23 of the rim 11, substantially completely occupying the plural spaces between the pole pieces 12 and shields 14, extending radially inward from the rim 11 and terminating at the inner ends 13 of the pole pieces. Thus, the filling 27 combines with the inner pole-piece ends 13 to define the central opening 28.

Adjacent to and spaced inward from the rim 11, each pole piece 12 is formed with a forwardly and rearwardly extending thru bore or hole 30. That is, each hole 30 extends through a respective pole piece 12, substantially normal to the plane of the rim 11 and pole pieces. The holes 30 may be of a diameter greater than the width or thickness of the respective pole pieces, so as to extend into the filling 27, for purposes which will appear presently.

The pole-piece holes 30 are each located adjacent to and spaced radially inward from the rim 11. An additional hole 31 is formed in each pole piece 12 radially inward of the hole 30, and spaced radially outward from the inner pole-piece end 13. The holes 30 are advantageously of a diameter greater than the lateral dimension or width of the pole pieces, so as to extend radially into the filling 27, and are advantageously internally threaded, as best seen in FIGURE 2. Thus, the holes 31 extend forwardly and rearwardly through respective pole pieces 12, opening through the front and rear sides thereof, similar to the holes 30.

Inserted in each pole-piece hole 30 is a generally cylindrical magnet 33. Each magnet 33 substantially completely fully occupies its respective hole 30, being axially rotatable therein, and provided on its underside beneath the respective pole piece 12 with an enlarged head or circumferential flange 34 carrying centrally on its underside a slotted boss 35. The enlarged head or flange 34 of each magnet 33 is unitary therewith and located exteriorly of the respective receiving hole 30 in engagement with the underside of the associated pole piece 12 and adjacent filling material 27. The magnets 33 are each permanently magnetized in a transverse or diametral direction so that 180 degree rotation thereof reverses the magnetic field in the receiving pole piece 12.

Inserted in each of the internally threaded holes 31 is a control or vernier slug 36, say in the form of a threaded rod of ferrous or other suitable magnetic material. The slug or rod 36 is inserted into its receiving hole 31 a selected distance by rotation of the slug in its threaded engagement, and held at the selected position of insertion by a locknut 37 threaded on the slug and engageable with the associated pole piece 12.

A flat generally annular front plate 40, of nonmagnetic material such as aluminum or the like, may be conformably engaged in the forward region of rim 11 against the forward sides or edges of pole pieces 12 and shields 14, as well as the intermediate filling material 27, so as to have its front or outer face substantially flush with the front edge 23 of the rim 11. The annular front plate 40 may be cemented or otherwise suitably secured in position, and is formed with a central thru opening or hole 41 concentric with and of a diameter considerably greater than that of the central opening 28. The front plate 40 extends radially inward from the rim 11 sufficiently to overlie and close the front ends of holes 30 and 31.

Interiorly of the rim 11, adjacent to the lower rim edge 21, there is provided a generally flat, annular locking ring 42 adapted to seat on the several magnet heads or flanges 34. That is, the locking ring 42 extends conformably about the interior of the rim 11, substantially flush with the lower rim edge 21, across the several magnet heads 34, as best seen in FIGURES 2 and 4. At angularly spaced locations along the locking ring 42, a plurality of mounting members or fasteners, such as threaded members 43, may extend through the locking ring and in threaded engagement into respective shields 14. In this manner, the locking ring 42 is held in position within the rim 11 extending across the magnet heads 34. In addition, a plurality of holding members 44, such as setscrews, are threadedly engageable through the locking ring 42, each into holding engagement with a respective magnet head or flange 34. By this construction, the magnets 33 are all effectively held in their respective positions of adjustment against undesired movement. However, adjustment of any one or more magnets 33 may be readily achieved by loosening of the respective setscrew 44 and rotation of the associated magnet head 34 by its slotted boss 35, followed by retightening of the setscrew.

Formed in the body of filling material 27, at one location thereof, is a radially outwardly extending slot 46. That is, the slot 46 extends radially outward from the central opening 28, angularly spaced between a pair of adjacent pole pieces 12, and terminates at its radially outer end spaced from the rim 11 and short of the adjacent magnets 33. As best seen in FIGURES 1 and 4, the several pole pieces 12 are all equally angularly spaced about the rim 11, and each in diametral alignment with an opposite pole piece. Further, the shields 14 are located each between an adjacent pair of pole pieces 12, except at one pair of diametrically opposed locations, where shields are absent. It is at one of these diametrically opposed locations, where a shield is absent, that the slot 46 is formed.

A coil assembly is generally designated 50, and includes a mounting member 51 mounted in the slot 46. The mounting member 51 is a generally E-shaped flat member or bracket having an intermediate portion 52 extending vertically through and beyond the slot 46. Upper and lower arms 53 and 54 extend from the upper and lower ends of the intermediate portion 52 to positions, respectively, above and below the central opening 28, as best seen in FIGURE 3. The free ends of the arms 53 and 54 are coiled or bent into eyes 55 and 56 in alignment with each other and concentric with the opening 28. A medial arm 47 extends from a medial region or intermediate portion 52 into the central opening 28. A securement member or plate 57 is fixed, as by welding or otherwise, to the mounting member 51, and detachably secured in facing engagement with the top plate 40, as by fasteners 58.

Upper and lower aligned bearings 59 and 60 are carried by respective upper and lower eyes 55 and 56, and a coil 61 is mounted in the bearings by suitable pivots for free rotation axially within the opening 28. A core 62 is fixed to the arm 47 within the coil 61, and a needle or pointer 63 is fixed to the coil 61, extending radially therefrom over the top plate 40.

As is conventional, suitable electrical connections are made to the coil 61, and a scale is provided on the top plate 40 for indication thereon by the needle 63.

In use, the several magnets 30 on one side of the unshielded interpole spaces are arranged generally in one direction, while the several magnets on the other side of the unshielded interpole spaces are arranged in the other direction. For example, the magnets 33 on the left of the centerline in FIGURE 1 may have their north poles inward, while the magnets on the right of the centerline may have their south poles inward. In this manner, the pole pieces, magnets and rim 11 combine to define a complete or closed magnetic circuit. Also, it will be appreciated that the magnetic field in which the coil 61 moves substantially completely surrounds the coil, so that a much greater coil movement is effected, for increased scale length in a meter of relatively small size.

To compensate for larger variations or discrepancies in field strength, the several magnets 33 are adjusted by rotation to produce stronger or weaker fields in their respective pole pieces. It is possible, and sometimes required, that a particular magnet even be magnetically reversed with respect to its adjacent magnets. The shields 14 provide effective isolation or magnetic insulation between adjacent magnets, so that undue coupling thereof is prevented. For fine adjustment of the magnetic field at any desired location, the vernier-conrol slugs 36 are moved into or out of their respective polt pieces, thereby increasing or decreasing the lines of magnetic force therethrough. As the holes 31 receiving the slugs 36 are of a size or diameter greater than the width of the receiving pole piece 12, it will be appreciated that highly sensitive adjustment may be obtained.

In FIGURE 6 is shown a slightly modified embodiment of pole piece 12a, which is of tapering configuration in the radially inward direction, as opposed to the constant cross-sectional configuration of the first-described embodiment. Also, the magnet head 34a of FIGURE 6 is provided with indicia corresponding to the location and direction of the magnetization of the associated magnet.

A further embodiment of pole piece 12b is shown in FIGURE 7, wherein the pole piece is of substantially constant cross-sectional configuration from its radially outer extremity to a location adjacent to and spaced inward from its inner end 13b, and the inner portion 65 tapers radially inward.

FIGURE 8 illustrates a slightly modified embodiment, wherein the rim 11c includes a plurality of radially inwardly extending pole pieces 12c, but the shield members are absent. In this embodiment, it is advantageous to start rough calibration with adjacent magnets arranged in repelling relation. Thus, adjacent magnet heads 34c are located with like poles proximate to each other to minimize magnetic coupling therebetween, and are rotated in opposite directions to achieve rough calibration.

While the angular arrangement of pole pieces 12 in the first-described embodiment and of pole pieces 12c in the embodiment of FIGURE 8 is such that the pole pieces are in diametrically opposed pairs, it is appreciated that this arrangement is not essential under all conditions. In particular, opposed pole pieces may be offset from each other, if desired, to obtain a greater number of angularly spaced adjustment locations. This is, with the pole pieces diametrically opposed, a pair of pole pieces define a single adjustment position along the arc of pointer movement. However, with a pair of offset opposed pole pieces, there is provided a pair of adjustment positions along the arc of pointer movement.

In the embodiment of FIGURE 9, there is shown a magnet head or flange 34d provided with pole indicia, and additional markings or graduations to enable more accurate setting and repeatability of adjustment.

While the magnets 33 of the first-described embodiment have been disclosed as uncovered, it may be preferable to encase the magnets, as the magnet 33e of FIGURE 10. A casing 66 completely encloses the magnet 33e, including a cylindrical side wall 67, a generally circular bottom end wall 68 and an inturned lip 69 on the upper end. The upper end may be enclosed by a disc 70 retained beneath the inturned lip. The casing 66 may be of any suitable material, such as plastic, brass, or the like, and is advantageously provided on its lower end with a threaded stud 70 having a screwdriver end slot 71, to afford convenience in rotative adjustment and locking.

Another embodiment of magnet casing is shown in FIGURE 11 and there generally designated 66f, wherein an enlarged head or flange 34f is formed on the lower end of the casing, and provided with a slotted adjustment boss 35f. While the casing 66 and 66f of FIGURES 10 and 11 insure accurate rotation of the enclosed magnets with the casings, and may be desired under certain severe atmospheric conditions, the use of a magnet head 34 in the first-described embodiment cemented or otherwise secured to the magnet 33 has been found satisfactory.

In FIGURE 12 is shown a further embodiment of coil-assembly mounting member or bracket 51g, wherein an arm 53g is provided with a separate, but fixedly secured ring or eye 55g, rather than the integrally formed eye 55.

In the embodiment of FIGURE 13, a pole piece 12 is illustrated with a slightly modified embodiment of vernier-control slug 36h, wherein an externally threaded tubular member or sleeve 73 is threadedly engaged in a hole 31, and encases or surrounds a ferrous rod or slug 74. The sleeve or case 73 may be of plastic or nonferrous material. Such construction may be advantageous at certain locations where it is necessary to accurately control relatively small amounts of magnetic force, while the slug 36 of the first-described embodiment may be advantageous at other locations for the control of relatively large amounts of magnetic force. Further, the relationship between the diameter of tube or sleeve 73 and that of internal rod 74 may vary for use at different locations about the pole arrangement.

In FIGURE 14 is shown a slightly modified embodiment wherein the underside of the field poles 12i, and the filling material and shields, may all be covered by a generally flat, annular bottom plate 75 having thru openings 76 and 77 for receiving a magnet control boss 70i and a vernier slug 36, respectively. The bottom plate 75 is fixed to the field assembly by suitable means, such as nonferrous fasteners threaded into the filling material.

A further embodiment is shown in FIGURE 15, wherein the pole pieces 12j have their inner portions 80 of decreasing vertical dimension toward the inner end 13j. Thus, the radially outer portion 81 of each pole piece 12j is of greater height than the inner end thereof, and of the associated coil 61. By this construction, a magnet 33j of increased height and strength may be employed.

From the foregoing, it is seen that the present invention provides a meter construction which fully accomplishes its intended objects and is well adapted to meet practical conditions of manufacture, calibration, use and recalibration. Also, the instant meter construction is advantageously suited for mounting in any desired location without need for recalibration, as the rim 11 provides effective magnetic shielding from environmental influences.

What is claimed is:

1. In an electrical measuring instrument, the combination comprising an annular rim of magnetic material, a plurality of angularly spaced elongate pole pieces of magnetic material extending generally radially inwardly from engagement with said rim and terminating short of each other to leave a central opening, a plurality of magnets each located in a respective pole piece and adjustably rotatable therein about an axis parallel to said rim axis for selectively varying the magnetic force and direction in the associated pole piece, holding means for holding said magnets in their selected positions of adjustment, a plurality of slugs of magnetic material each adjustably inserted a selected distance into a respective pole piece for fine adjustment of the magnetic forces in said pole pieces, and a measuring instrument coil mounted for rotation in said opening under the magnetic influence of said pole pieces.

2. The combination according to claim 1, in combination with a plurality of angularly spaced magnetic shields each interposed in spaced relation between an adjacent pair of said magnets to insulate the magnetic forces from respective magnets.

3. The combination according to claim 2, in combination with a filling of nonmagnetic material substantially completely occupying the spaces between said pole pieces and shields and surrounding said movable coil.

4. The combination according to claim 3, said magnets each being generally cylindrical having a diameter extending beyond the receiving pole piece and axially rotatable for adjustment thereof.

5. The combination according to claim 4, in combination with a nonmagnetic casing enclosing each magnet, and an axial stem extending from each casing for effecting rotative adjustment of the enclosed magnet.

6. The combination according to claim 4, said slugs being threadedly inserted in said pole pieces for selective adjustment by rotation.

7. The combination according to claim 6, in combination with a non-magnetic sleeve encasing each slug and threadedly engaged with the associated pole piece.

References Cited

UNITED STATES PATENTS

| | | | |
|---|---|---|---|
| 1,660,197 | 2/1928 | Holte | 335—222 X |
| 1,907,343 | 5/1933 | Carpenter | 324—151 X |
| 2,312,336 | 3/1943 | Holliday | 324—155 X |
| 3,139,581 | 6/1964 | Berger | 324—150 |
| 3,249,780 | 5/1966 | Ibrahim et al. | 310—154 |
| 3,378,768 | 4/1968 | Hautman | 324—150 |

RUDOLPH V. ROLINEC, Primary Examiner

J. J. DEVITT, Assistant Examiner

U.S. Cl. X.R.

310—154; 324—155; 335—222